United States Patent
Curbow

(10) Patent No.: US 6,636,801 B2
(45) Date of Patent: *Oct. 21, 2003

(54) DELIVERING LOCATION-DEPENDENT SERVICES TO AUTOMOBILES

(75) Inventor: David Wayne Curbow, Sunnyvale, CA (US)

(73) Assignee: Sun Microsystems, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/840,517

(22) Filed: Apr. 23, 2001

(65) Prior Publication Data

US 2002/0156571 A1 Oct. 24, 2002

(51) Int. Cl.⁷ .......................... G06F 17/00; G01C 21/00
(52) U.S. Cl. .................. 701/207; 701/211; 701/117; 379/111
(58) Field of Search ............... 701/207, 117, 701/201, 202, 210, 211; 455/456, 457; 379/111, 113, 133, 134

(56) References Cited

U.S. PATENT DOCUMENTS

| | | | | |
|---|---|---|---|---|
| 5,345,606 A | * | 9/1994 | Duckeck et al. ........ | 455/186.1 |
| 5,539,398 A | * | 7/1996 | Hall et al. ............... | 340/907 |
| 5,699,056 A | * | 12/1997 | Yoshida ................ | 340/905 |
| 5,850,190 A | * | 12/1998 | Wicks et al. ............ | 340/905 |
| 5,864,305 A | * | 1/1999 | Rosenquist ............ | 340/905 |
| 5,933,094 A | * | 8/1999 | Goss et al. ............. | 340/905 |
| 5,933,100 A | * | 8/1999 | Golding ................ | 340/995 |
| 5,991,610 A | * | 11/1999 | Ruhl et al. ............ | 455/186.1 |
| 6,064,318 A | * | 5/2000 | Kirchner, III et al. ... | 340/905 |
| 6,073,075 A | * | 6/2000 | Kondou et al. ......... | 701/203 |
| 6,151,550 A | | 11/2000 | Nakatani .............. | 701/117 |
| 6,163,696 A | | 12/2000 | Bi et al. ............... | 455/436 |
| 6,178,374 B1 | * | 1/2001 | Mohlenkamp et al. .... | 701/117 |
| 6,185,503 B1 | * | 2/2001 | Sumizawa ............. | 701/209 |
| 6,240,364 B1 | * | 5/2001 | Kerner et al. .......... | 701/210 |
| 6,255,963 B1 | * | 7/2001 | Heimann et al. ....... | 340/905 |
| 6,256,577 B1 | * | 7/2001 | Graunke .............. | 701/117 |
| 6,266,607 B1 | * | 7/2001 | Meis et al. ............ | 701/117 |
| 6,304,816 B1 | * | 10/2001 | Berstis ................. | 701/117 |
| 6,321,162 B1 | * | 11/2001 | Hessing ............... | 701/210 |
| 6,463,382 B1 | * | 10/2002 | Bullock ............... | 701/117 |

* cited by examiner

Primary Examiner—Tan Q. Nguyen

(57) ABSTRACT

An automobile equipped with a Global Positioning System (GPS) receiver and an on-board computer is configured to transmit the automobile's location and direction of motion to a central server. The central server is configured to identify the automobile, the route taken by the automobile. The central server obtains location information or geo-related information pertinent to the route taken by the automobile, filters the data according to certain criteria, and then delivers an audible version of the filtered data to an audio output device such as a radio receiver located in the automobile.

12 Claims, 2 Drawing Sheets

DELIVERING LOCATION-DEPENDENT SERVICES TO AUTOMOBILES

TECHNICAL FIELD

The present invention is directed in general to provisioning information services to automobiles, and in particular, to a method for providing location-aware information to automobiles.

BACKGROUND

Systems that provide traffic information to automobiles exist today. U.S. Pat. No. 6,151,550 to Nakatani discloses a traffic information providing system which can display information of a forward section of an on-road radio transmission/reception device even if there is no oncoming vehicle. Nakatani teaches a system with an on-vehicle radio transmission/reception device that has a moving time calculation device for calculating moving times of traveling sections which are arbitrarily divided, a memory for storing the moving time calculated by the moving time calculation device, and a transmission device for transmitting the moving time; and the on-road radio reception device has a reception device for receiving a moving time from the moving time calculation device, a recognition unit for recognizing a traffic situation from the moving time to form traffic situation data, a data communication device for transmitting/receiving the traffic situation data between the plurality of on-road radio transmission/reception devices, and a display device for displaying the traffic situation data obtained by the data communication device.

Navigational systems such as Global Positioning Systems (GPS) were originally designed for military applications. Typically, the GPS employs 24 spacecraft in 20,200 km circular orbits inclined at 55 degrees. These spacecraft are placed in 6 orbit planes with four operational satellites in each plane. GPS receivers use triangulation of the GPS satellites' navigational signals to determine their location. The satellites provide two different signals that provide different accuracies. Coarse-acquisition (C/A) code is intended for civilian use, and is deliberately degraded. The accuracy using a typical civilian GPS receiver with C/A code is typically about 100 meters. An uncorrupted version, where the precision code (P) is not degraded, is used by the U.S. military. The military version provides an accuracy of about 20 meters. Over the years, degraded versions of this system, called the Standard Positioning Service (SPS), have been used for civilian services such as corporate vehicle fleet tracking, recreational uses and surveying.

Vehicle-tracking systems using GPS are well known. Numerous applications such as accident reporting, and emergency response systems have been designed. But systems that provide or manage geographically related data (geo-related information systems) such as traffic and weather information and management systems that filter and route only relevant information in an audible format to a radio receiver located in a moving automobile have not been designed. Accordingly, there is a need for such a system and method.

SUMMARY

The invention is as set out in the independent claims. Particular forms of the invention are as described in the dependent claims. In one embodiment, an automobile equipped with a Global Positioning System (GPS) receiver and an on-board computer is configured to transmit the automobile's location and direction of motion to a central server. The central server is configured to identify, based on a user's identifier or based on an identifier for the automobile, the route taken by the automobile. Thereafter, the central server is configured to obtain location information or geo-related information pertinent to that route taken by the automobile, filter the data according to certain criteria, and then deliver audible version of the filtered data by passing the data through a text-to-speech synthesizer to a radio or an audio receiver located in the automobile in an audible format. A driver in the automobile will be presented with relevant location or geo-related information, thereby enabling a better commute.

BRIEF DESCRIPTION OF THE DRAWINGS

The present invention is more readily understood from the following detailed description with reference to the accompanying drawings, and wherein.

DETAILED DESCRIPTION

The principles of the present invention may be practised in the following manner. While a few embodiments are described herein, it should be understood that the principles of the invention as claimed are not limited by these described embodiments.

Figure 1:
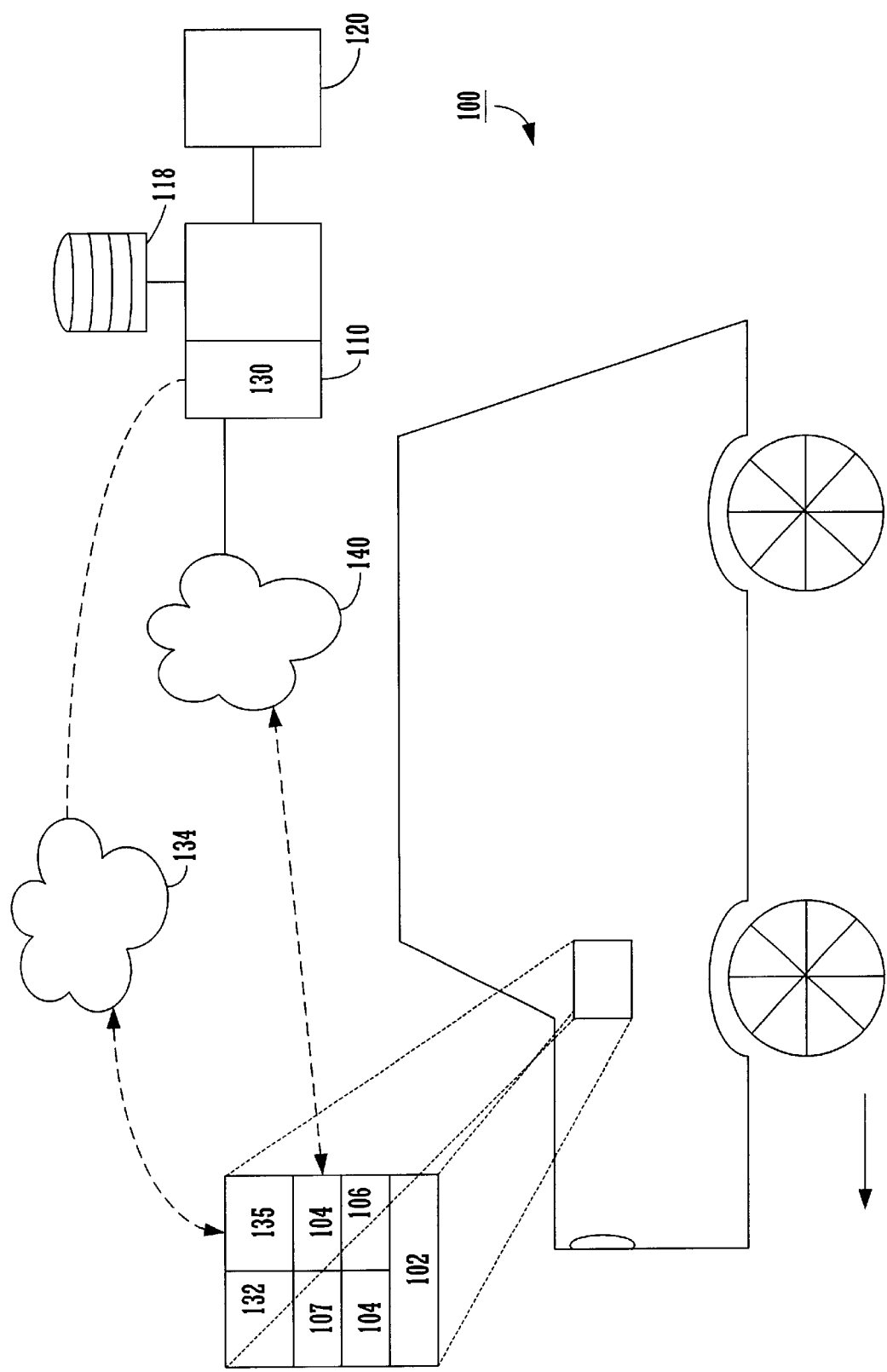
FIG. 1 depicts an illustrative architecture of computing devices according to which the principles of the present invention may be practised.

Referring to FIG. 1, a moving vehicle 100 such as an automobile is equipped with an on-board computer 102 coupled to a location determining device such as a Global Positioning Service (GPS) receiver 104, and two optional components, (a) a timer (not shown), and (b) a compass (not shown) to determine the direction of travel of motion of the moving vehicle 100. It is noted that some GPS units provide time and motion information as well. In such cases, the optional timer and compass are not necessary for the invention to be practiced. Additionally, the on-board computer 102 is configured to determine the seed at which the automobile travels by receiving the tachometer reading in a digital format. Also coupled to the moving vehicle 100 is a communications device such as a wireless transceiver 109, which enables the establishment of a communication path between the moving vehicle and a server computer 110 via a wireless network 140. In one embodiment, the server computer 110 is coupled to a database 118, which could be commercially available relational database management software such as the Oracle® Relational Database Management program available from the Oracle Corporation of Redwood City, Calif. The server computer 110 is configured to receive geo-related data from a variety of sources 120 such as traffic and other location-related information gathering organizations, such as weather information gathering organizations, those that provide information such as the nearest gas station, (e.g., ETAK™, CalTrans™, and others in Calif.), wire services and the like. The server computer 110 is configured to direct information from the geo-related data to a filter 130, which is configured to exclude information that is not relevant to the moving vehicle 100. The output of the filter 130 is coupled to a text-to-speech synthesizer 132, examples of which include the ViaVoice™ text-to-speech synthesizer marketed by the IBM Corporation of Armonk, N.Y., or the Vocalizer™ marketed by the Nuance Communications Corporation of Menlo Park, Calif., DecTalk™ system marketed by the Compaq Computer Corporation, and a radio network 134. The radio network could be the same as or different from the wireless network 140. The text-to-speech synthesizer is configured to receive the filtered geo-related information from the filter 130, and to provide an output in a digitized speech format such as a .wav or .au format that could be transmitted to the wireless transceiver 109 for transmission to the on-board receiver 104.

Also shown in FIG. 1 is a radio receiver 135 typically located in an automobile to receive radio broadcasts. In one embodiment, the on-board receiver 104 uses the radio receiver 135 as an audio output device.

In another embodiment, the text-to-speech synthesizer 132 is advantageously located in the moving vehicle, and not located at the server computer 110. In such cases, the server computer 110 transmits filtered geo-related information to the wireless transceiver 109 in the form of text or other data. After the wireless receiver 109 receives the geo-related information, the on-board computer 102 is configured to instruct the text-to-speech synthesizer 132 to translate the geo-related information into spoken instructions, whereupon the spoken instructions are rendered audible via the radio receiver 135. Persons of ordinary skill in the art know how to integrate a device such as the previously mentioned text-to-speech synthesizers with the server computer 110 or the on-board computer 102.

In one embodiment, the moving vehicle 100 is a car driven by a person. Other embodiments may include a moving vehicle that is automatically driven. In one embodiment, the moving vehicle 100—for example, a car— is equipped with a commercially available GPS receiver 104 such as those available from the Magellan Corporation of Santa Clara, Calif.

The server computer 110 could be a programmed general purpose computer such as an UltraSparc™ computer marketed by Sun Microsystems, Inc. of Palo Alto, Calif. The programmed general purpose computer contains a microprocessor such as the SPARC™ microprocessor, memory device such as semiconductor memory, storage device such as a hard disk, an optional input device such as a keyboard or a mouse, and an optional display device such as a display like a CRT or a flat panel display, and a network connection such as a TCP/IP card. The database 118 could be an attached database or co-located with the server computer 100.

Advantageously, the server computer is coupled via the network connection to the public packet switching networks such as the Internet—also known as the 'web'—and a wireless communications network.

The wireless communication network 140 could include, for example, a plurality of wireless base stations or nodes (not shown in FIG. 1), which communicate directly with the moving vehicle, for example, the base station that handles an ongoing mobile telephone "call" for the moving vehicle. It is assumed that as an illustration, the wireless network is an IS-95 code division multiple access (CDMA) wireless communication system. It should be understood, however, that the invention is not limited to use with any particular type of communication system, but is instead more generally applicable to any wireless communication system, as will be apparent to those skilled in the art. Thus, the disclosed techniques are also applicable to other types of wideband and narrowband wireless systems.

Not shown in FIG. 1 is mobile base station. Other details of overlapping mobile stations that have overlapping service areas to cover a particular geographical area or a particular route along which the moving vehicle could travel are also not shown in FIG. 1. It is understood that the location of the moving vehicle could be determined by methods such as those described in U.S. Pat. No. 6,163,696 to Bi, et al., the disclosure of which patent is incorporated herein by reference in its entirety.

The geographical (geo-related) information gathering sources 120 shown in FIG. 1 could be geographical and time-sensitive content provider databases (not shown) with which the server computer 110 is communicatively coupled. These content provider databases databases typically contain information such as weather conditions, traffic conditions, and other location or geo-related information useful to a person in an automobile. In some cases, this location or geo-related information is also time sensitive. In an embodiment, the content provider databases provide instantaneous or "real-time" information, obtained from various sources such as news gathering and reporting services and the like. In one embodiment, this geographical information is indexed and stored in a manner suitable for easy retrieval based on a geographic code such as GPS coordinates or street addresses.

In an embodiment, the filter 130 is a computer program written in a language such as the C programming language or the Java™ programming language. The filter program 130 executes on the server computer 110 or on a specially designed computer (not shown) with sufficient memory to receive and store relevant data obtained from the geo-related information gathering sources 120.

In the following description of the operation of the invention, a "trip" is defined as a movement of a vehicle from an origination point where the vehicle starts to a destination point where the vehicle stops.

Figure 2:
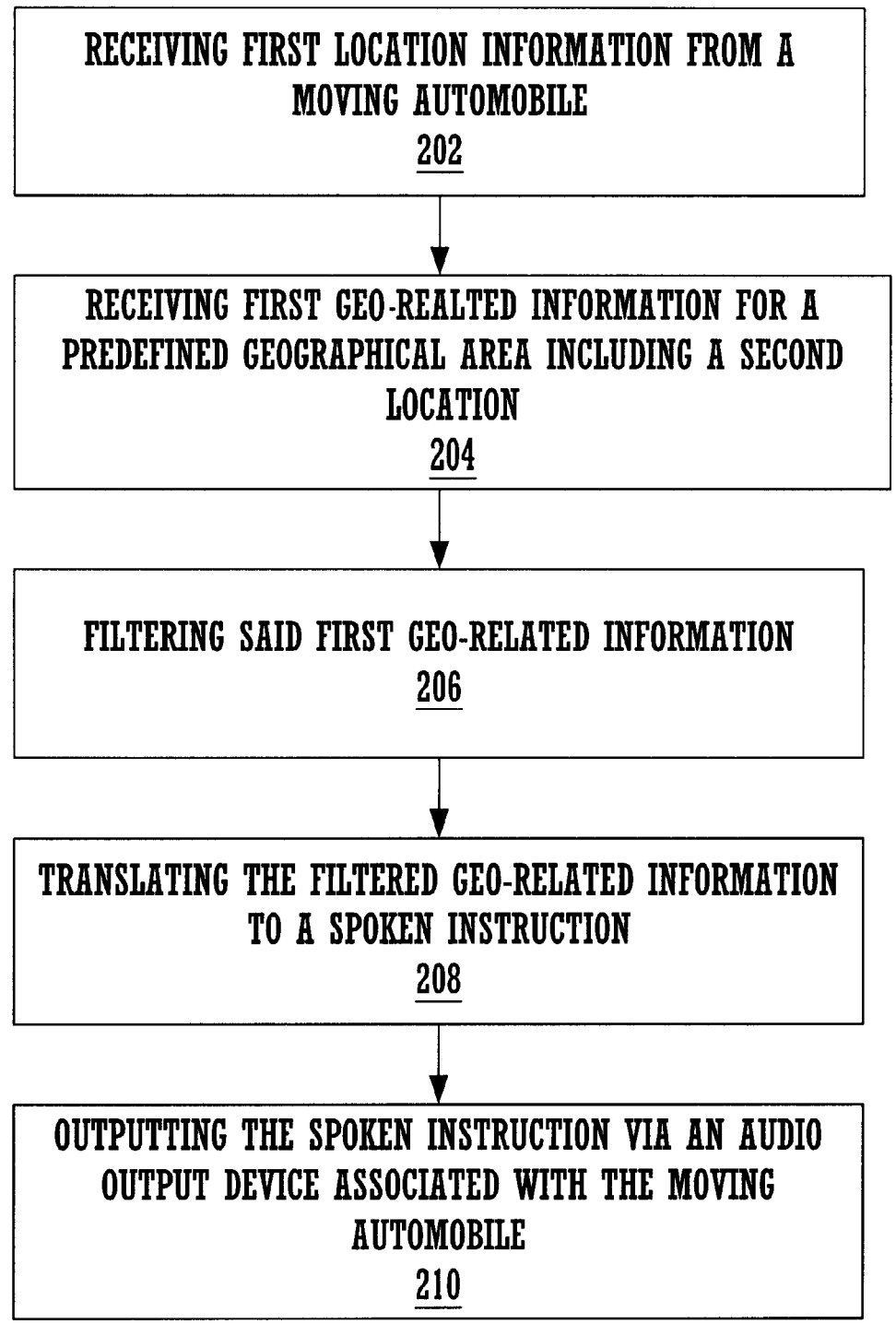
FIG. 2 is a flow-chart of steps performed in an exemplary embodiment of the principles of the present invention.

Referring now to FIG. 2, a service provider operates the server computer 110 that provides the service. A user of an automobile registers himself with the service provider and is given an identification number, which is programmed to the on-board computer 104. The GPS receiver determines the exact coordinates of the position of the automobile at any given time and outputs the information to the on-board computer.

During a first step, the automobile's identification number and the frequent routes taken by the automobile are recorded in the database 118 (step 200). As a practical matter, the automobile and server record routes taken by the automobile. This means the driver does not have to do anything different from normal driving. It also means that new routes, or routes to new destinations will be recorded. Of course, we do not need to record every trip ever made in the car—only check whether this seems to be the same as a currently known route, or different—and update our count of the number of times a route is taken. The route may be recorded as a series of GPS coordinates that could form the path taken by the automobile from a starting point to an ending point In other embodiments, this step, of pre-recording the automobile's route, is not necessary to practice the invention When the automobile starts a trip, the on-board computer 102 is programmed to transmit the automobile's identification number and its location (position) to the server computer 110. The server computer 110 receives the identification number and records the start of the trip and the location of the automobile in the database 118 (step 202).

In other embodiments, a record based on a user's (driver) identity is used since one driver may drive multiple cars, and multiple drivers may drive the same car. However, since all cars may not be able to distinguish different drivers, e.g. by unique ignition keys, it is less perfect, but acceptable to simply record trips by all drivers in the car.

Suppose that the user takes a trip to work. Assume further that the route from the user's home to his work and the typical times when the user makes his usual route to work are recorded in the database 118 as described above. In an embodiment, the server computer 110 determines, based in probabilistic estimate, the route that the user takes to reach his destination based on the time of day, day of week, and other information.

As soon as the automobile is started, the server computer 110 determines that the user typically travels from home to work at that time. Then the server computer 110 executes a query to the geo-related information sources 120, and receives traffic, weather and other information for the geographical area encompassing the user's route (step 204). The geo-related information is then input to the filter 130 along with the user's route and then determine information along that route that matches that filter. The same can be done with relation to certain predetermined points of interest along the user's route. In an embodiment, these points of interest could be major highway interesections or areas of frequent traffic bottlenecks that are predetermined by the service provider or by the user. In other embodiments, the points of interest could be determined at real-time, depending on whether a recent traffic incident occurred. For example, when a traffic accident has occurred somewhere on the user's typical route it may be worth reporting to the user. If additional information about the accident is available, such as the expected time required to clear is available, then better information can be provided to the driver. Accidents that are expected to clear well before the driver is at that location are probably not worth reporting to the driver.

The filter 130 then eliminates all geo-related data except those that could be of interest to the user as described above (step 206). This could be done, for example, by the filter parsing the data to determine a particular key word to identify a noteworthy incident. For example, along the route frequented by the user, suppose there is an accident, or a delay because of congestion or construction activity. The filter 130 parses the data to identify any indication of an accident or delay. All data about incidents not "relevant" to this driver's route will be ignored. What makes an incident relevant can be understood from the following examples. As stated previously, one measure of relevance could be accidents that are estimated to clear before the driver will reach can be ignored. Incidents that cause only minor delays, say less than 10% of the expected drive time, can also be ignored. Incidents that do not have an expected clear time are more complex. Assuming that an incident on a freeway will affect more cars, and takes longer to clear, than a similar incident on a roadway with fewer cars. The relevance of data is directly proportional to the number of cars traveling on the roadway (taking into account the number of lanes on the roadway).

In another embodiment, suppose that the user travels along a new route. The GPS receiver 104 determines the user's position, the compass determines the direction of the user's travel and the on-board computer 102 measures the speed of the automobile. These data, of the user's position, direction and speed, are transmitted via the wireless network 140 to the server computer 110. Using this information, the server computer 110 executes an algorithm to predict the route taken by the user.

The algorithm used by the server computer to predict the route taken by the user may be described as follows.

Suppose that historically a driver has taken route 1 over route 2 or 3 to the same destination some percentage (say 70%) of the time. Assuming that on a given day the driver is likely to continue following that pattern, there's a 70% chance that they will take route 1 over route 2 or 3. This assumption is continued until the driver changes the route causing contrary data. For example if on the day of interest the driver doesn't exit the freeway at the typical offramp. In that case, the algorithm would determine if there were other destinations that the driver has previously driven to and then obtain information for the route to that destination. Since drivers drive to different destinations, this algorithm is executed continuously. When leaving home in the morning the driver is likely to drive 70% of the time to destination 1, 20% of the time to destination 2, and destinations 3, 4, 5 and 6 each 5% of the time. The algorithm would check first for the most likely destinations, 1 and 2 and report to the user the traffic conditions on the driver's most likely routes to those destinations. Once the driver deviates from his routine or a previously recorded pattern—such as not exiting a highway at a known off ramp—then it is more likely that one of the other destinations or routes is the driver's intention and a report could be made on those routes or destinations. Thus, in the above example, the direction of travel of the user may indicate that the user was traveling toward an interstate highway, and the server computer 110 may obtain traffic, road-condition information, or other information such as the location of a grocery store or a gas station, etc., for the interstate highway. The filter 130 then determines if any incident is to be reported to the automobile.

Suppose that the filtered data indicates that an incident occurred in the direction of the user's travel. This information is translated into a spoken instruction by the text-to-speech synthesizer (step 208). The output of the synthesizer is then transmitted to the wireless receiver mounted on the automobile, whereupon the receiver outputs an audible instruction to the user via an output device associated with the automobile, for example, an AM/FM radio output device (speakers) on board the automobile (step 210). Of course, this radio could be any radio such as satellite radio, and the radio could include any other audio output device located in the automobile. In another embodiment, the filtered data is transmitted to the wireless receiver mounted on the automobile in a text form, whereupon the receiver inputs the filtered text to an on-board text-to-speech synthesizer, which translates the geo-related data instructions to an audible instruction, which is played on the audio output device.

The foregoing describes a method and system for providing location-aware services to an automobile in the form of a spoken instruction. Persons of ordinary skill in the art may make several modificaitons to the disclosed embodiments without significantly departing from the spirit and scope of the inventive principles. All such modifications or rearrangements should be understood to be within the scope of the appended claims.

What is claimed is:

1. A method of providing geo-related data to an automobile in motion, the method comprising the steps of:

recording at least one route for a moving automobile;

receiving a first location information from said moving automobile, said first location information being formatted in a manner to convey a first static position of the automobile, a first direction of motion of the automobile, and a first speed of the automobile;

automatically determining whether said moving automobile is traveling said route;

receiving first geo-related information for a predefined geographical area along said route, said predefined geographical area including a second location, said second location being a location at which the automobile is estimated to be at the a first future time, said second location based on the first static position, the first direction of motion, and the first speed;

filtering said first geo-related information to contain filtered geo-related information for said second location;

translating said filtered geo-related information to a spoken instruction; and transmitting said spoken instruction to an audio output device coupled to the moving automobile.

2. The method of claim 1, where the geo-related information is traffic related information for a particular geographical region.

3. The method of claim 1, where the geo-related information is weather related information for a particular geographical region.

4. The method of claim 1, where the first static position of the automobile is an instantaneous position of a moving automobile expressed in a standard coordinate system.

5. A method of receiving geo-related information in a moving automobile, the method comprising the steps of:

transmitting at least one mute for the moving automobile;

transmitting a first location information from the moving automobile, said first location information being formatted in a manner to convey a first position of the automobile, a first direction of motion of the automobile, and a first speed of the automobile;

automatically determining whether said moving automobile is traveling said route;

receiving filtered geo-related data for a predefined geographical area along said route, said predefined geographical area including a second location, said second location being a location at which the automobile is estimated to be at the a first future time, said second location based on the first position, the first direction of motion, and the first speed;

translating said filtered geo-related information to a spoken instruction; and outputting the spoken instruction via an audio output device coupled to the moving automobile.

6. The method of claim 5, where the geo-related information is traffic related information for a particular geographical region.

7. The method of claim 5, where the geo-related information is weather related information for a particular geographical region.

8. The method of claim 5, where the first static position of the automobile is an instantaneous position of a moving automobile expressed in a standard coordinate system.

9. A system for providing geo-related information, said system comprising:

a server computer comprising a processor and memory;

said server computer coupled to a wireless transceiver, said wireless transceiver communicatively coupled to a wireless network, said wireless network configured to communicate with an on-board wireless transceiver mounted on an automobile; and a filter coupled to the server computer and configured to receive geo related information from at least one source of instantaneous and real-time geo-related information;

wherein the processor is configured to execute instructions stored in the memory, said instructions configured to record at least one route for a moving automobile; to direct the processor to receive first location information from said moving automobile, said first location information being formatted in a manner to convey a first static position of the automobile, a first direction of motion of the automobile, and a first speed of the automobile; to automatically determine whether said moving automobile is traveling said route; to receive first geo-related information for a predefined geographical area along said route, said predefined geographical area including a second location, said second location being a location at which the automobile is estimated to be at the a first future instant, said second location based on the first static position, the first direction, and the first speed; to filter said first geo-related information to contain filtered geo-related information for said second location; to translate the filtered geo-related information into spoken instructions; and to transmit said spoken instructions to an audio output device coupled to the moving automobile.

10. The system of claim 9, where the geo-related information is traffic related information for a particular geographical region.

11. The system of claim 9, where the geo-related information is weather related information for a particular geographical region.

12. The system of claim 9, where the first static position of the automobile is an instantaneous position of a moving automobile expressed in a standard coordinate system.

* * * * *